US 6,631,557 B2

(12) United States Patent
Ogimoto

(10) Patent No.: US 6,631,557 B2
(45) Date of Patent: Oct. 14, 2003

(54) METHOD AND APPARATUS FOR MOUNTING ELECTRONIC DEVICE

(75) Inventor: Shinichi Ogimoto, Ebina (JP)

(73) Assignee: Shibaura Mechatronics Corporation, Yokohama (JP)

(*) Notice: Subject to any disclaimer, the term of this patent is extended or adjusted under 35 U.S.C. 154(b) by 159 days.

(21) Appl. No.: 09/926,238

(22) PCT Filed: Jan. 31, 2001

(86) PCT No.: PCT/JP01/00643
§ 371 (c)(1),
(2), (4) Date: Sep. 28, 2001

(87) PCT Pub. No.: WO01/58233
PCT Pub. Date: Aug. 9, 2001

(65) Prior Publication Data
US 2002/0157246 A1 Oct. 31, 2002

(30) Foreign Application Priority Data
Jan. 31, 2000 (JP) ........................................ 2000-021491

(51) Int. Cl.[7] ................................................. H05K 3/30
(52) U.S. Cl. ...................... 29/832; 29/564.1; 29/564.2; 29/740; 29/840
(58) Field of Search ................. 29/832, 564.1, 29/740, 564.2, 840

(56) References Cited

U.S. PATENT DOCUMENTS 5,337,467 A * 8/1994 Kogure et al.

FOREIGN PATENT DOCUMENTS

| JP | 56-010936 | * | 2/1981 |
|----|-----------|---|--------|
| JP | 62-006260 | * | 1/1987 |
| JP | 3-289199 |   | 12/1991 |
| JP | 6-69692 |   | 3/1994 |
| JP | 06-286878 | * | 10/1994 |
| JP | 7-273499 |   | 10/1995 |
| JP | 08-307099 | * | 11/1996 |
| JP | 10-73796 |   | 3/1998 |

* cited by examiner

Primary Examiner—Carl J. Arbes
(74) Attorney, Agent, or Firm—Oblon, Spivak, McClelland, Maier & Neustadt, P.C.

(57) ABSTRACT

A part mounting apparatus mounts a part, such as a film electronic part, accurately and efficiently on a substrate, such as a glass substrate. A measuring device (21) moves along the edges of a glass substrate (31) and measures the distance between the measuring device (21) and the glass substrate (31) at predetermined positions. The measuring device (21) gives measured data to a controller (22). The controller (22) determines the state of deformation of the glass substrate (31) on the basis of the measured data and controls suctions to be applied by suction pads (12) included in a substrate conveying unit (10) to the glass substrate (31) on the basis of the measured data. The glass substrate (31) being conveyed by the substrate conveying unit (10) receives downward suctions of the suction pads (12) and upward reaction forces of props (13). The surface of the glass substrate (31) can be brought to a level by thus correcting local warps in the glass substrate (31) and the glass substrate (31) can be held at a level corresponding to that of the upper ends of the props (13).

9 Claims, 6 Drawing Sheets

METHOD AND APPARATUS FOR MOUNTING ELECTRONIC DEVICE

TECHNICAL FIELD

The present invention relates to a part mounting apparatus for mounting parts on a substrate and a part mounting method.

BACKGROUND ART

A known part mounting apparatus for mounting an electronic part having the shape of a film (hereinafter referred to as "film electronic part") on a glass substrate has been used as part mounting apparatus for fabricating a flat panel display, such as a liquid crystal panel.

Such a part mounting apparatus recognizes the positional relation between a glass substrate conveyed by a substrate conveying unit, and a film electronic part conveyed by a part conveying unit by means of an imaging device and an image processing device, and locate the film electronic part at a predetermined position in an edge portion of the glass substrate on the basis of position data provided by the image processing device. Subsequently, a pressing tool presses the film electronic part against the edge portion of the glass substrate supported on a backup tool to connect the film electronic part to the edge portion of the glass substrate with a connecting member, such as an anisotropic conductive film or the like.

There is the trend toward greater glass substrates on which film electronic parts are mounted. Greater glass substrates are subject to deformation, such as warping. When an edge portion of a warped glass substrate is supported on the backup tool and the pressing tool presses the film electronic part against the edge portion of the glass substrate, the film electronic part slides on the glass substrate, whereby film electronic part mounting accuracy is reduced greatly.

There has been proposed a correcting method employing a correcting unit for correcting a warped glass substrate to bring the surface of the warped glass substrate to a level before mounting a film electronic part on an edge portion of the glass substrate.

FIG. 7 shows a part mounting apparatus for carrying out such a correcting method. Referring to FIG. 7, a substrate conveying unit 60 conveys a glass substrate 31 to a mounting position. Upon the arrival of the glass substrate 31 at the mounting position, a backup tool 63 rises to support an edge portion of the glass substrate 31 from below. Subsequently, a correcting unit 65 descends and depresses the glass substrate 31 supported on the backup tool 63 to correct a warp in the glass substrate 31. Then, a pressing tool 64 descends to attach a film electronic part 32 with a connecting member 33, such as an anisotropic conductive film, to the flattened surface of the edge portion of the glass substrate 31. A conveyor stage 61 included in the substrate conveying unit 60 is provided with a plurality of vertically compressible suction pads 62 to hold the glass substrate 31 on the conveyor stage 61 by suction.

However, the foregoing conventional method is incapable of satisfactorily correcting a large warp and local warps in the glass substrate 31 because of restrictions on the position where the correcting unit 65 presses the glass substrate 31 and the pressure exerted by the correcting unit 65 (FIG. 8).

The foregoing method holds the glass substrate 31 by the plurality of suction pads 62 of the substrate conveying unit 60. Therefore, the positional relation between the glass substrate 31 and the conveyor stage 61 is apt to change when the correcting unit 65 presses the glass substrate 31, whereby the accuracy of mounting the film electronic part 32 on the glass substrate 31 is apt to decrease.

Moreover, the throughput of final products decreases because the foregoing method needs to drive the correcting unit 65 every time the film electronic part is mounted on the edge portion of the glass substrate 31.

SUMMARY OF THE INVENTION

The present invention has been made in view of those problems and it is therefore an object of the present invention to provide a part mounting apparatus and a part mounting method capable of accurately and efficiently mounting a part, such as a film electronic part or the like, on a substrate, such as a glass substrate or the like.

According to the present invention, a part mounting apparatus for mounting an electronic part on a substrate includes a substrate conveying unit that conveys a substrate; a backup tool that supports an edge portion of a substrate conveyed by the substrate conveying unit; and a pressing tool disposed on the opposite side of the backup tool with respect to the substrate; wherein the substrate conveying unit includes a conveyor stage, a plurality of suction pads disposed in an edge portion of the conveyor stage to hold the substrate by suction from below, and a plurality of supporting members disposed in the edge portion of the conveyor stage to support the substrate thereon in cooperation with the suction pads.

Preferably, the suction pads and the supporting members are arranged alternately. The plurality of suction pads may be arranged along the edges of the conveyor stage, and the supporting members may be disposed on the outer side of the suction pads nearer to the edges with respect to the suction pads and adjacently to the suction pads, or on an inner side of the suction pads farther from the edges with respect to the suction pads and adjacently to the suction pads. Preferably, the part mounting apparatus further includes a suction adjusting mechanism capable of adjusting suctions (attractions) to be applied by the suction pads to the substrate according to the state of deformation of the substrate. Preferably, the part mounting apparatus further includes a deformation measuring device for measuring the state of deformation of the substrate, and a controller for controlling the respective suctions of the suction pads of the substrate conveying unit on the basis of measured data provided by the measuring device. Preferably, the part mounting apparatus includes a position adjusting mechanism for adjusting the respective positions of the suction pads and the supporting embers according to the state of deformation of the substrate. Preferably, the substrate conveying unit is provided with an adjusting mechanism for adjusting the respective heights of the supporting members from the conveyor stage.

According to the present invention, a part mounting method of mounting an electronic part on a substrate includes the steps of: holding a substrate on a conveyor stage by a plurality of suction pads and a plurality of supporting members disposed on the conveyor stage; measuring the state of deformation of the substrate held on the conveyor stage; adjusting at least suctions to be applied by the suction pads to the substrate, the respective positions of the suction pads on the conveyor stage, the respective positions of the supporting members on the conveyor stage or the respective heights of the supporting members according to the measured state of deformation of the substrate; conveying the substrate held on the conveyor stage to a mounting position by moving the conveyor stage; and mounting a part on the substrate conveyed to the mounting position.

Thus, the present invention disposes the plurality of suction pads and the plurality of supporting members in the edge portion of the conveyor stage, and corrects the deformation, such as a warp, in the substrate by a suction exerted vertically on the substrate by the suction pads and a reaction force exerted vertically on the substrate by the supporting members. Therefore, a large warp and local warps in the substrate can be effectively corrected, the surface of the substrate can be brought to a level and the substrate can be held at a level corresponding to that of the upper ends of the supporting members and, consequently, the part can be accurately and efficiently mounted on the substrate

BEST MODE FOR CARRYING OUT THE INVENTION

Preferred embodiments of the present invention will be described with reference to the accompanying drawings.

The construction of a part mounting apparatus applying the present invention will be described with reference to FIGS. 4A and 4B.

Figure 4A:
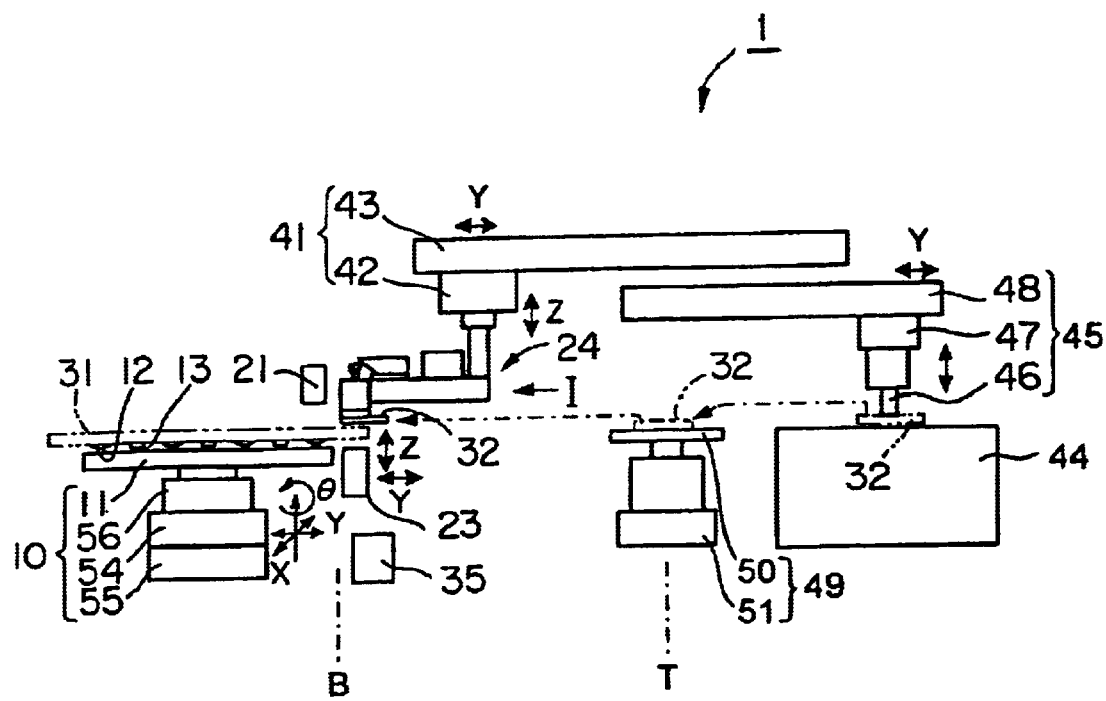
FIGS. 4A and 4B are a side elevation and a plan view, respectively, of the part mounting apparatus according to the present invention.
Figure 4B:
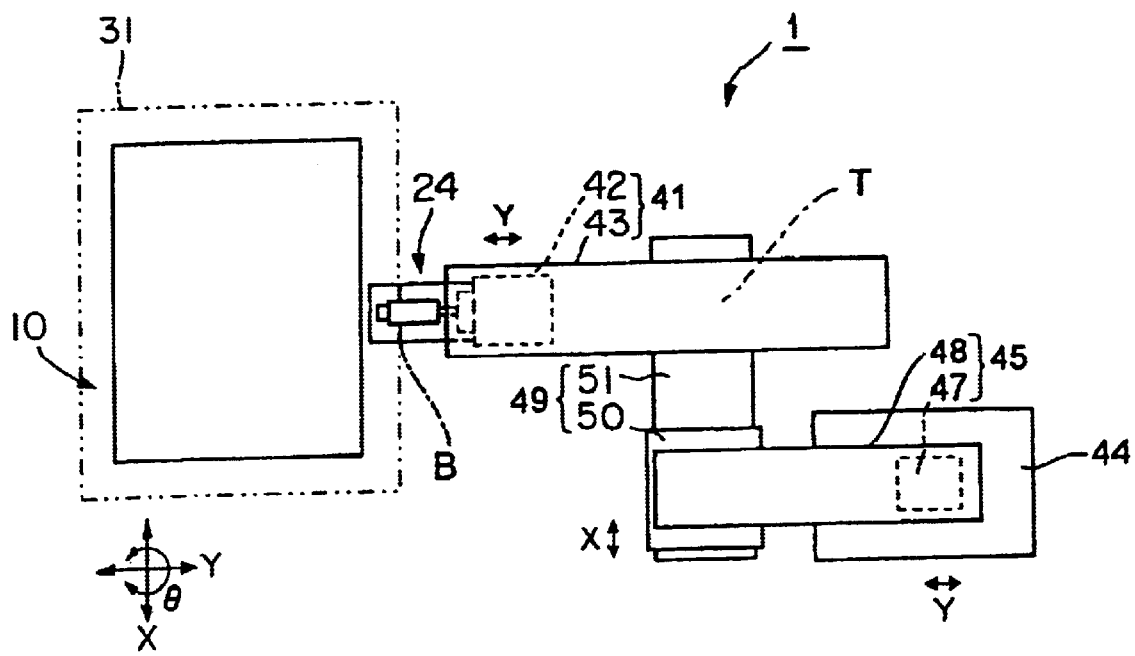

Referring to FIGS. 4A and 4B, a part mounting apparatus 1 for mounting a film electronic part 32 on a glass substrate 31 includes a pressing tool 24, and a pressing tool moving mechanism 41 for moving the pressing tool 24. The pressing tool 24 holds the film electronic part 32 by suction and mounts the same on the glass substrate 31. The pressing tool moving mechanism 41 includes a Z-direction moving device 42 for moving the pressing tool 24 in vertical directions (Z-directions), and a Y-direction moving device 43 for moving the pressing tool 24 together with the Z-direction moving device 42 in horizontal directions (Y-directions). The pressing tool moving mechanism 41 moves the film electronic part 32 held by suction on the pressing tool 24 from a transfer position T to a mounting position B corresponding to an edge portion of the glass substrate 31.

A part feeder 44 including a tray or a punching mechanism feeds the film electronic part 32. A part transfer mechanism 45 delivers the film electronic part 32 fed by the part feeder 44 to a middle stage 49. The part transfer mechanism 45 includes a suction nozzle 46 for holding the film electronic part 32 by suction, a Z-direction moving mechanism 47 for moving the suction nozzle 46 in the Z-directions, and a Y-direction moving device 48 for moving the suction nozzle 46 together with the Z-direction moving device 47 in the Y-directions. The middle stage 49 includes a table 50 for supporting the film electronic part 32 thereon, and an X-direction moving device 51 for moving the table 50 in horizontal directions, i.e., X-directions.

The part feeder 44, the part transfer mechanism 45, the middle stage 49, the pressing tool moving mechanism 41 and the pressing tool 24 constitute a part conveying unit.

A substrate conveying unit 10 conveys the glass substrate 31 on which the film electronic part 32 is to be mounted. The substrate conveying unit 10 includes a conveyor stage 11, an X-table 54 for moving the conveyor stage 11 in X-directions, Y-table 55 for moving the conveyor stage 11 in Y-directions, and a θ-table for turning the conveyor stage 11 in θ-directions. A backup tool 23 is disposed at a position corresponding to the mounting position B, so that the pressing tool 24 located at the mounting position B is opposite to the backup tool 23. The backup tool 23 supports the edge portion of the glass substrate 31 conveyed to the mounting position B by the substrate conveying unit 10 thereon when the film electronic part 32 is pressed and mounted on the glass substrate 31 by the pressing too 124. An imaging device 35 for forming images of the glass substrate 31 and the film electronic part 32 is disposed at the mounting position B. The backup tool 23 is retracted from the field of view of the imaging device 35 when the imaging device 35 forms the images of the glass substrate 31 and the film electronic part 32. The glass substrate 31 and the film electronic part 32 are provided with positioning marks, respectively. The imaging device 35 forms images of things including the positioning marks in an objective region. An image processing device, not shown, processes images formed by the imaging device 35 to recognize the respective positions of the glass substrate 31 and the film electronic part 32.

The substrate conveying unit 10 shown in FIG. 1 will be described with reference to FIGS. 1, 2A and 2B.

Figure 1:
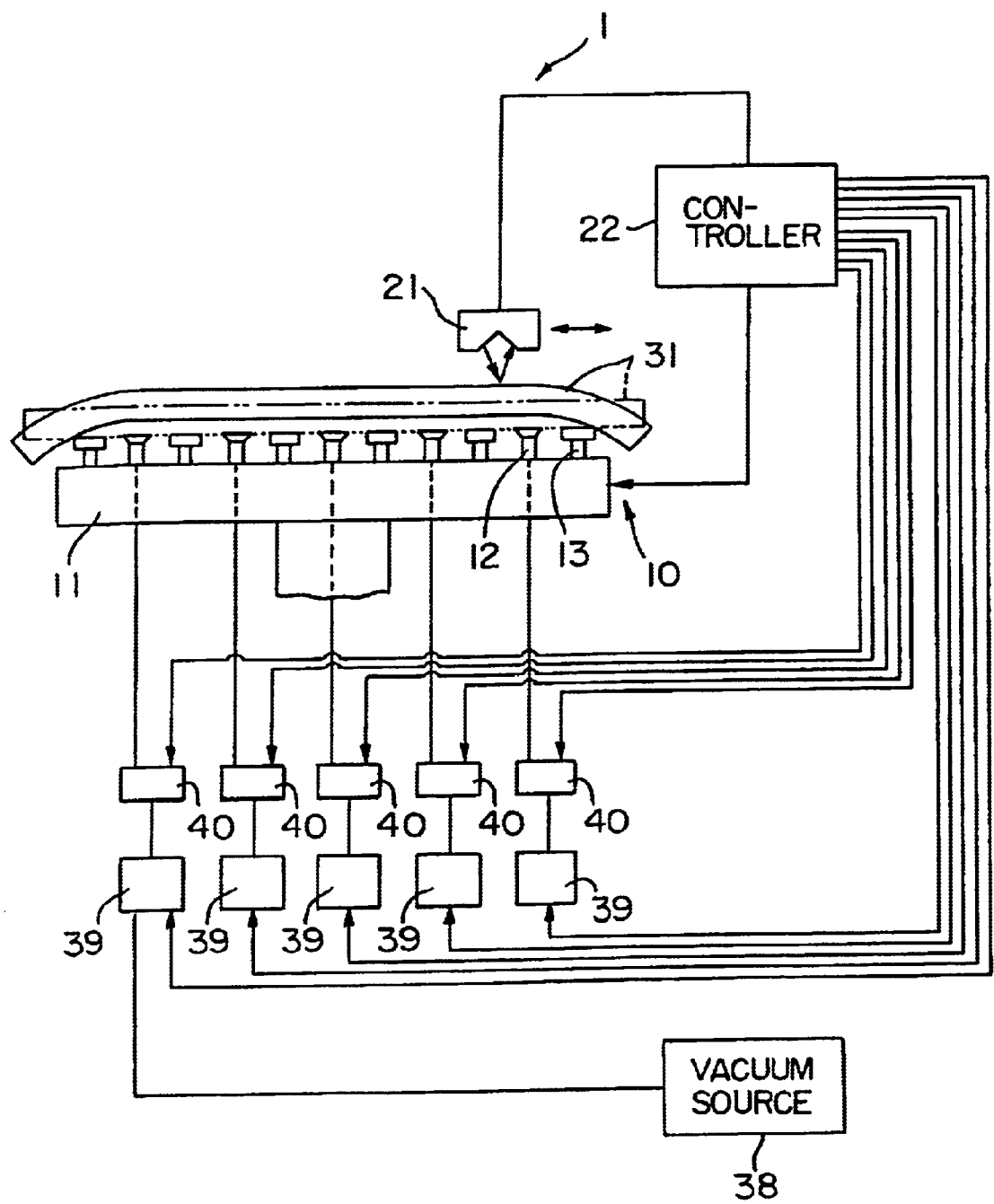
FIG. 1 is a view of an essential portion of a part mounting apparatus in a preferred embodiment of the present invention.
Figure 2A:
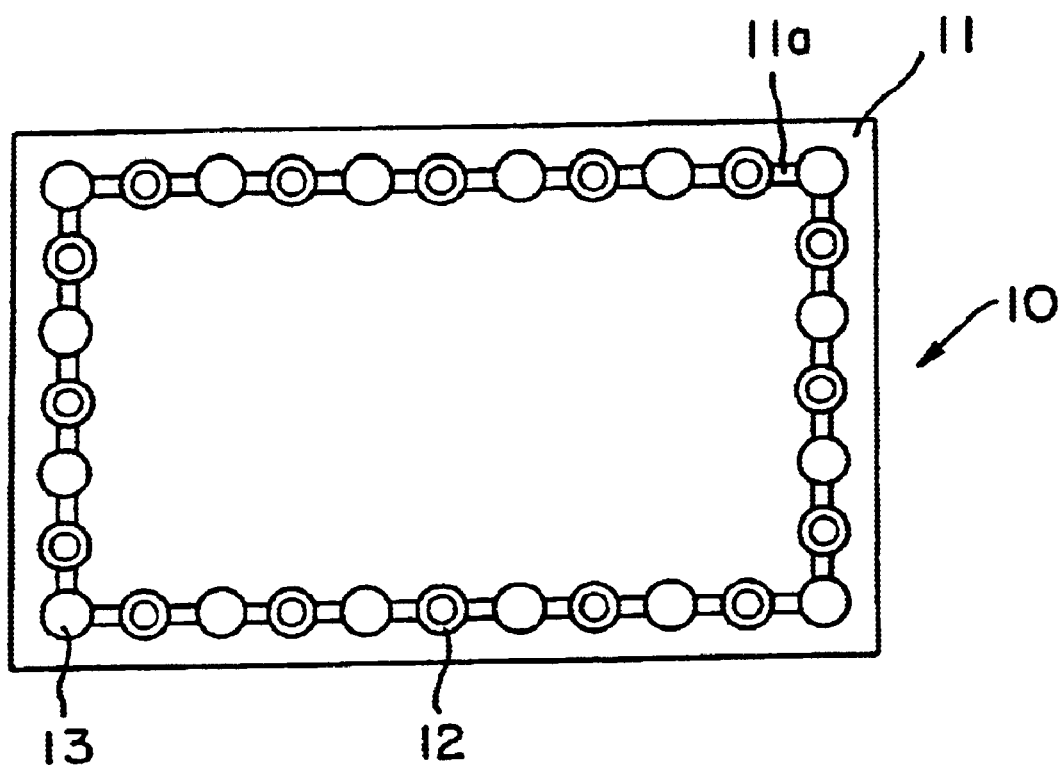
FIGS. 2A and 2B are a plan view and a side elevation, respectively, of a substrate conveying unit shown in FIG. 1.
Figure 2B:
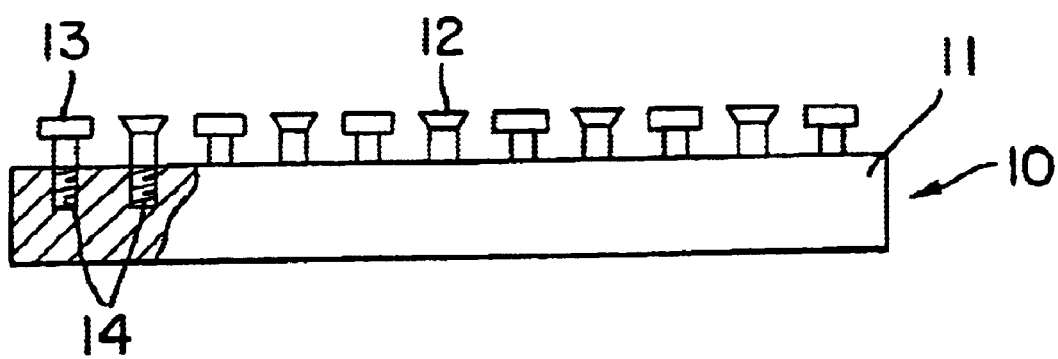

Referring to FIGS. 1, 2A and 2B, the conveyor stage 11 of the substrate conveying unit 10 is provided with a plurality of suction pads 12 arranged along edges of the conveyor stage 11 to attract the glass substrate 31 from below, and a plurality of props (supporting members) 13 arranged along the edges of the conveyor stage 11 to support the glass substrate 31 thereon in cooperation with the suction pads 12.

The conveyor stage 11 is substantially the same in shape as the glass substrate 31 and is slightly smaller than the glass substrate 31. Preferably, the size of the conveyor stage 11 is determined so that the conveyor stage 11 may not interfere with the backup tool 23 and the pressing tool 24 when an edge portion of the glass substrate 31 is inserted in a space between the backup tool 23 and the pressing tool 24. Preferably, the conveyor stage 11 is formed of a metal or a resin.

The suction pads 12 and the props 13 are arranged alternately along the edges of the conveyor stage 11. The props 13 may be formed in any suitable shape such as the shape of a circular cylinder as shown in FIGS 1, 2A and 2B, a prism or a hemisphere. Preferably, the props 13 are formed of a material resistant to deformation, such as a metal.

Grooves 11a are formed in a surface of the conveyor stage 11 along the edges of the conveyor stage 11 and the suction pads 12 and the props 13 are fitted in the grooves 11a. The suction pads 12 and the props 13 can be moved along the grooves 11a for positional adjustment according to the state of deformation of the glass substrate 31.

A measuring device 21 for measuring the state of deformation of the glass substrate 31 carried by the substrate conveying unit 10 and a controller 22 for controlling the suctions of the suction pads 12 of the substrate conveying unit 10 on the basis of measured data measured by the measuring device 21 are associated with the substrate conveying unit 10. The measuring device 21 is supported for movement along the edges of the glass substrate 31 to measure the distance between the measuring device 21 and the glass substrate 31 at predetermined measuring positions. The measuring device 21 may be, for example, a laser distance measuring device which measure a distance by using the reflection of a laser beam.

Each of the suction pads 12 of the substrate conveying unit 10 is connected through a pressure regulator 39 and a solenoid valve 40 to a vacuum source 38. The controller 22 controls the pressure regulators 39 and the solenoid valves 40 on the basis of the measured data provided by the measuring device 21, i.e., the state of deformation of the glass substrate 31, to adjust the respective suctions of the suction pads 12 individually. The vacuum source 38, the pressure regulators 39 and the solenoid valves 40 constitute a suction adjusting mechanism.

The operation of the embodiment thus formed will be described hereinafter.

Referring to FIGS. 4A and 4B, the part feeder 44 feeds the film electronic part 32 and the part transfer mechanism 45 delivers the film electronic part 32 to the middle stage 49. In the part transfer mechanism 45, the suction nozzle 46 attracts and holds the film electronic part 32 by suction, and the Z-direction moving mechanism 47 and the Y-direction moving device 48 move the suction nozzle 46 in the Z- and the Y-direction to transfer the film electronic part 32 held by the suction nozzle 46 onto the table 50 of the middle stage 49.

Subsequently, the X-direction moving device 51 of the middle stage 49 moves the middle stage 49 in the X-direction to carry the film electronic part 32 supported on the table 50 to the transfer position T.

The Z-direction moving device 42 and the Y-direction moving device 43 of the pressing tool moving mechanism 41 move the pressing tool 24 in the Z- and the Y-direction. The pressing tool 24 picks up the film electronic part 32 from the table 50 of the middle stage 49 by suction and carries the same from the transfer position T to the mounting position B, i.e., a position corresponding to the edge portion of the glass substrate 31.

Meanwhile, the measuring device 21 moves along edge portions of the glass substrate 31 supported on the suction pads 12 and the props 13 of the conveyor stage 11 of the substrate conveying unit 10, and measures the distance between the measuring device 21 and the glass substrate 31 at predetermined positions, such as those corresponding to the edge portions of the glass substrate 31 supported on the suction pads 12 and the props 13. Measured data provided by the measuring device 21 is given to the controller 22. The controller 22 determines the state of deformation of the glass substrate 31 on the basis of the measured data, and controls the pressure regulators 39 and the solenoid valves 40 on the basis of the state of deformation of the glass substrate 31 to adjust the respective suctions of the suction pads 12 of the substrate conveying unit 10. For example, the controller 22 calculates the differences between the measured distances measured at every measured position and a reference value, such as the greatest measured distance, and controls the pressure regulators 39 so that the suction pads 12 corresponding to the greater differences exert greater suctions to the corresponding portions of the glass substrate 31. The suctions corresponding to the differences between the measured distances and the reference value are determined empirically or experimentally beforehand, and the differences and the corresponding suctions may be stored beforehand in the controller 22.

Figure 3A:
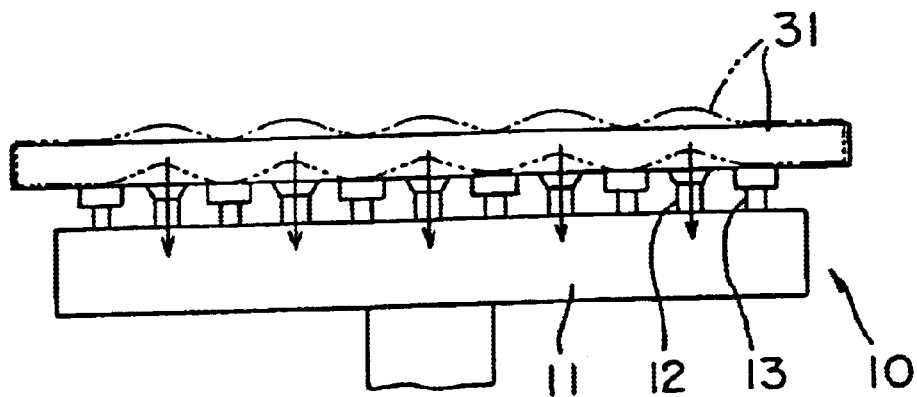
FIGS. 3A, 3B and 3C are views of assistance in explaining the operation of the substrate conveying unit shown in FIGS. 2A and 2B.

More concretely, if local warps are formed at equal intervals all over the glass substrate 31 as indicated by imaginary lines in FIG. 3A, all the suction pads 12 are made to exert equal suctions on the corresponding portions of the glass substrate 31. Consequently, the glass substrate 31 being conveyed by the substrate conveying unit 10 receives the downward suctions indicated by the arrows in FIG. 3A from the suction pads 12 and upward reaction forces from the props 13. Thus the local warps in the glass substrate 31 are corrected and the surface of the glass substrate 31 is brought to a level at the level of the upper ends of the props 13 as indicated by continuous lines in FIG. 3A.

Figure 3B:
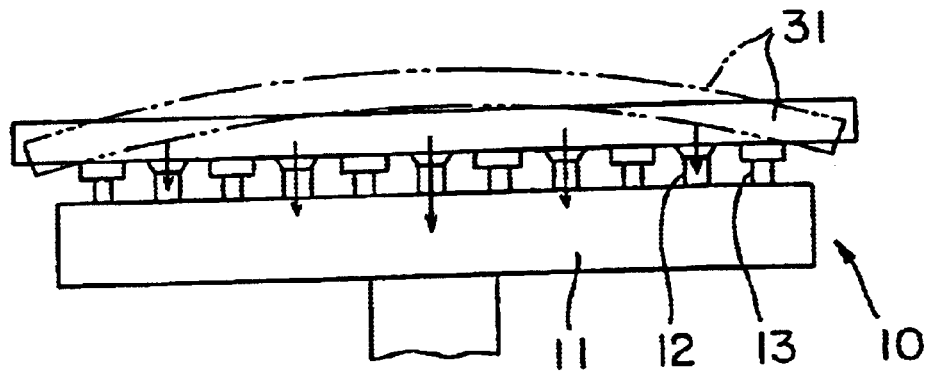

If a large monotonous warp is formed in an edge portion of the glass substrate 31 as indicated by imaginary lines in FIG. 3B, the suction pads 12 in a middle portion of the edge portion of the glass substrate 31 are made to exert greater suctions to the glass substrate 31 than those in end portions of the edge portion of the glass substrate 31 as indicated by the arrows in FIG. 3B. Thus, the greatly warped middle portions of the edge portions of the glass substrate 31 receive suctions greater than those received by lightly warped end portions of the same and the large warp in the glass substrate 31 can be effectively corrected as indicated by continuous lines in FIG. 3B.

Figure 3C:
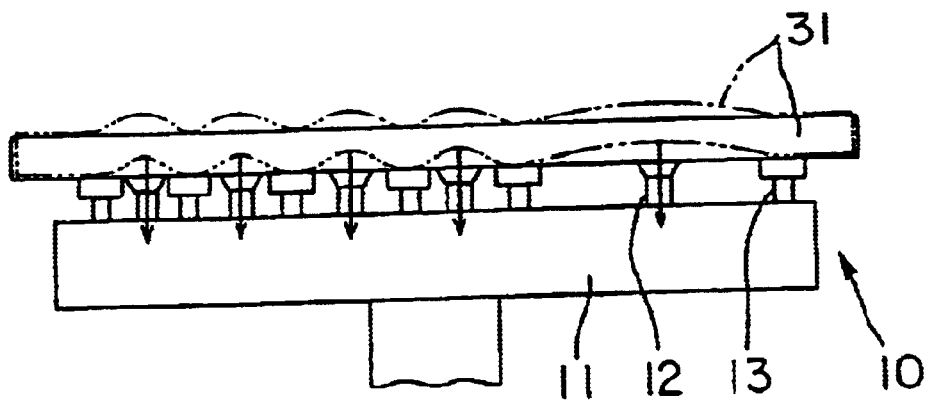

If local warps are formed irregularly all over the glass substrate 31 as indicated by imaginary lines in FIG. 3C, the respective positions of the suction pads 12 and the props 13 are adjusted according to the size and position of the warps as shown in FIG. 3C, and the suction pads 12 are made to exert suctions to the glass substrate 31 as indicated by the arrows in FIG. 3C. Consequently, warped portions of the glass substrate 31 being conveyed by the substrate conveying unit 10 receive the downward attractive and thus the local warps in the glass substrate 31 are corrected effectively as indicated by continuous lines in FIG. 3C.

The substrate conveying unit 10 conveys the glass substrate 31 thus flattened by correcting the warps to the mounting position B. The positional relation between the glass substrate 31 conveyed to the mounting position B by the substrate conveying unit 10, and the film electronic part 32 held on the pressing tool 24 by suction and moved by the pressing tool moving mechanism 41 is recognized by the operation of the imaging device and the image processing device to locate the glass substrate 31 and the film electronic part 32 correctly relative to each other. The film electronic part 32 Is located at a predetermined position in the edge portions of the glass substrate 31 on the basis of position data provided by the image processing device.

Then, the Z-direction moving device 42 and the Y-direction moving device 43 move the pressing tool 24 on the basis of the position data or the X-table 54, the Y-table 55 and the θ-table 56 of the substrate conveying unit 10 move the conveyor stage 11 to locate the film electronic part 32 held on the pressing tool 24 by suction correctly relative to the glass substrate 31.

Finally, the backup tool 23 supports the edge portion of the glass substrate 31 from below, the film electronic part 32 held on the pressing tool 24 by suction is pressed against the glass substrate 31 to attach the film electronic part 32 temporarily to the glass substrate 31 with a connecting member, not shown, such as an anisotropic conductive film. The film electronic part 32 temporarily attached to the glass substrate 31 is bonded permanently by a heating and pressing unit, not shown.

The part mounting apparatus in this embodiment includes the conveyor stage 11 provided with the plurality of suction pads 12 and the plurality of props 13 arranged in its edge portions, and corrects warps in the glass substrate 31 by the downward suctions applied to the glass substrate 31 by the suction pads 12 and the upward reaction forces applied to the same by the props 13. Thus a large monotonous warp and local warps in the glass substrate 31 can be effectively corrected and the glass substrate 31 can be brought to a level at the level of the upper ends of the props 13. Consequently, the film electronic part 32 can be accurately mounted on the glass substrate 31. Since the correcting operation of a correcting unit, which is essential to the conventional part mounting apparatus, is not necessary, the throughput of the products increases and the film electronic parts 32 can be efficiently mounted on the glass substrate 31.

Since the respective suctions of the suction pads 12 and the respective positions of the suction pads 12 and the props 13 are adjustable, proper suctions can be applied to proper portions of the glass substrate 31 according to the state of deformation of the glass substrate 31 and warps in the glass substrate 31 can be properly corrected. Since the measuring device 21 measures the state of deformation of the glass substrate 31 and the suctions of the suction pads 12 are controlled on the basis of the measured data provided by the measuring device 21, warps in the glass substrate 31 can be automatically corrected.

The conveyor stage 11 has the shape of a flat plate of a size slightly smaller than that of the glass substrate 31, and the suction pads 12 and the props 13 are arranged on the conveyor stage 11 along the edges of the same. Therefore, edge portions of the glass substrate 31 are supported on the props 13. Consequently, the extension of edge portions of an unnecessarily excessively great width of the glass substrate 31 beyond the arrangement of the props 13 can be prevented and the downward curving (drooping) of the edge portions of the glass substrate 31 can be effectively prevented.

Although the foregoing embodiment adjusts the suctions of the suction pads 12 by adjusting the working suction of the vacuum source 38 by controlling the pressure regulators 39 and the solenoid valves 40, the suction pads 12 may be replaced with suction pads of different diameters respectively capable of exerting different suctions.

Although the suction pads 12 and the props 13 are moved in the grooves 11a formed in the edge portions of the conveyor stage 11 to adjust the respective positions of the suction pads 12 and the props 13 on the conveyor stage 11 in the foregoing embodiment, a plurality of holes to receive the suction pads 12 and the props 13 may be formed in the conveyor stage 11 and the suction pads 12 and the props 13 may be fitted in the optional holes to adjust the respective positions of the suction pads 12 and the props 13 on the conveyor stage 11. The respective positions of the suction pads 12 and the props 13 can be automatically adjusted by providing the part mounting apparatus with a driving mechanism for moving the suction pads 12 and the props 13 along the grooves 11a and controlling the driving mechanism by the controller 22 on the basis of the measured data provided by the measuring device 21.

Although the suction pads 12 and the props 13 are fixed to the conveyor stage 11 in the foregoing embodiment, the suction pads 12 and the props 13 may be provided with externally threaded parts 14, respectively, as shown in FIG. 2B, and the suction pads 12 and the props 13 may be turned to adjust the respective heights of the suction pads 12 and the props 13 from the surface of the conveyor stage 11. When the respective heights of the suction pads 12 and the props 13 from the surface of the conveyor stage 11 is thus adjustable, warps in the glass substrate 31 can be satisfactorily corrected without being affected by the accuracy, thermal deformation and such of the conveyor stage 11. The conveyor stage 11 is formed of a metal or a resin and has the shape of a flat plate of a size slightly smaller than that of the glass substrate 31. Therefore, when the glass substrate 31 is enlarged, the conveyor stage 11 is enlarged accordingly. However, it is difficult to machine a large metal plate or a resin plate accurately in a flat shape and, sometimes, the conveyor stage 11 is deformed. Even if the conveyor stage 11 should be machined in a flat shape, it is possible, when fixing the conveyor stage 11 to a member, such as an XY table, that the accuracy of the conveyor stage 11 is affected by the accuracy of the member and is deformed. When the respective heights of the suction pads 12 and the props 13 from the surface of the conveyor stage 11 are adjustable, the respective heights of the suction pads 12 and the props 13 can be adjusted so that the upper ends of the suction pads 12 and the props 13 are included in the same horizontal plane regardless of the deformation of the conveyor stage 11. Consequently, warps in the glass substrate 31 can be satisfactorily corrected. The part mounting apparatus may be provided with a moving mechanism for vertically moving the suction pads 12 and the props 13, and a fixing mechanism for fixing the suction pads 12 and the props 13 in place to enable the adjustment of the respective heights of the suction pads 12 and the props 13. The respective heights of the suction pads 12 and the props 13 can be automatically adjusted by the controller 22 on the basis of the measured data provided by the measuring device 21 when the part mounting apparatus is provided with a driving mechanism for vertically moving the suction pads and the props 13.

Although the suction pads 12 and the props 13 can move along the edges of the conveyor stage 11 in the foregoing embodiment, the suction pads 12 and the props 13 may be slidable in directions perpendicular to directions parallel to the edges in addition to direction parallel to the edges. When the suction pads 12 and the props 13 are thus movable in those directions, the respective positions of the suction pads 12 and the props 13 relative to the edges of the conveyor stage 11 can be adjusted according to the bending strength of the glass substrate 31 dependent on the thickness of the glass substrate 31, and hence warps in glass substrates 31 respectively having different bending strengths can be satisfactorily corrected, and the glass substrates 31 can be attracted and supported properly by the suction pads 12 and the props 13 to prevent the drooping of the edge portions of the glass substrates 31 effectively.

Figure 5:
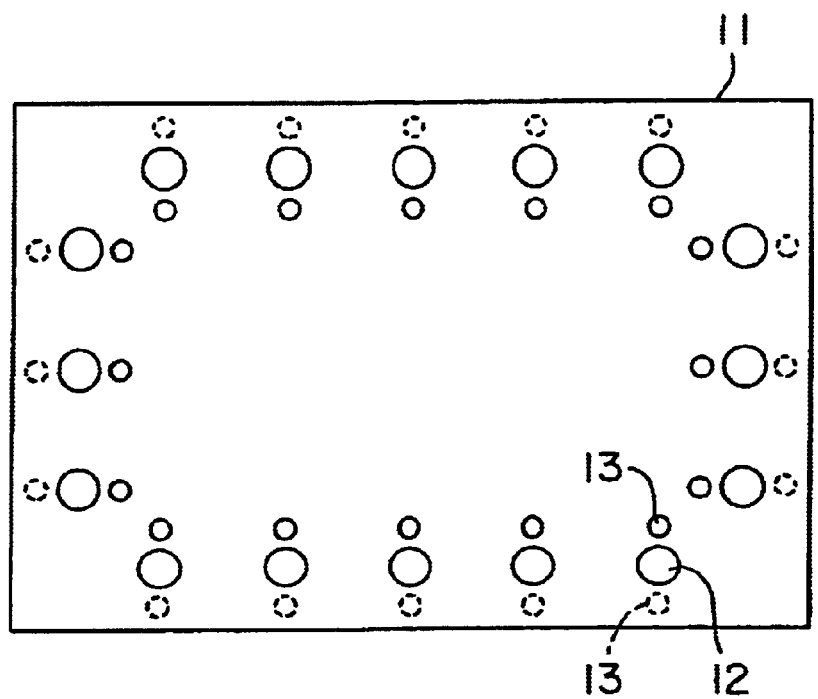
FIG. 5 is a plan view of a substrate conveying unit in a modification of the substrate conveying unit shown in FIG. 1.
Figure 6:
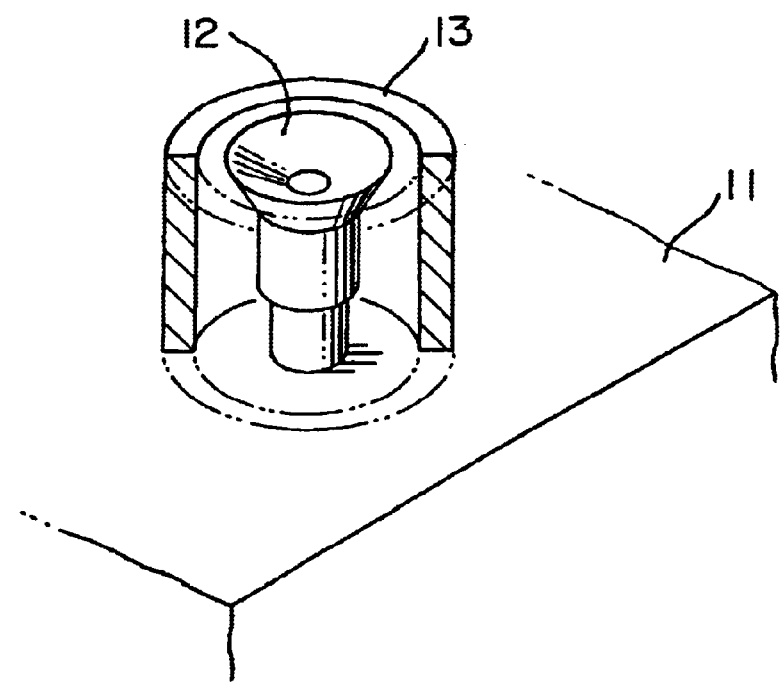
FIG. 6 is a perspective view of a substrate conveying unit in a further modification of the substrate conveying unit shown in FIG. 1.
Figure 7:
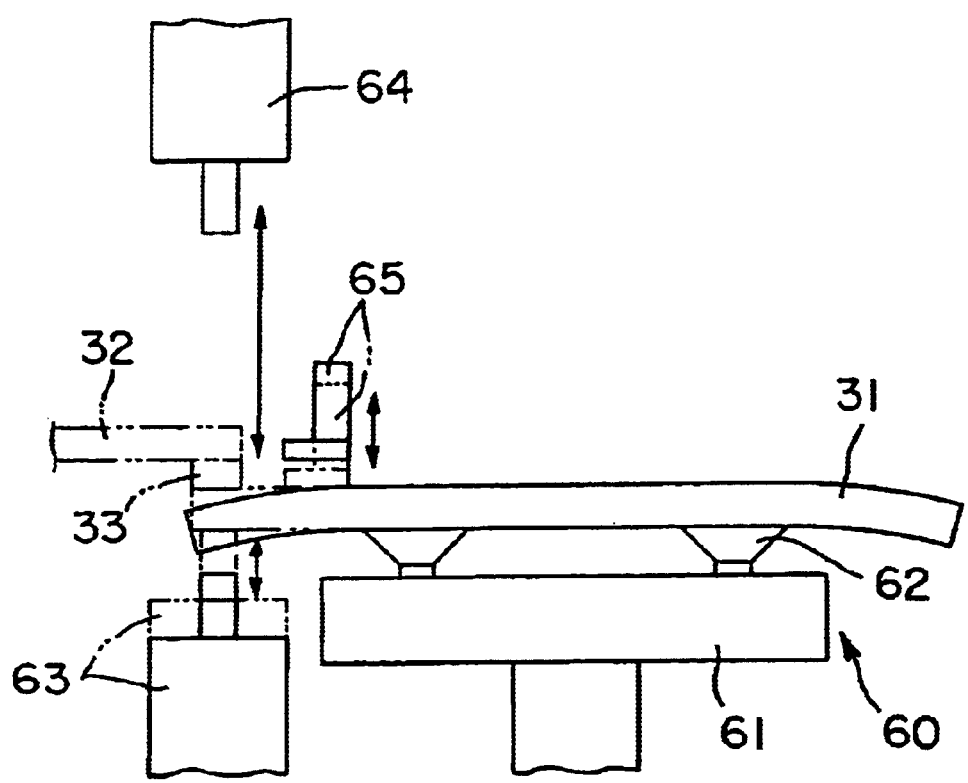
FIG. 7 is a view of a conventional part mounting apparatus.
Figure 8:
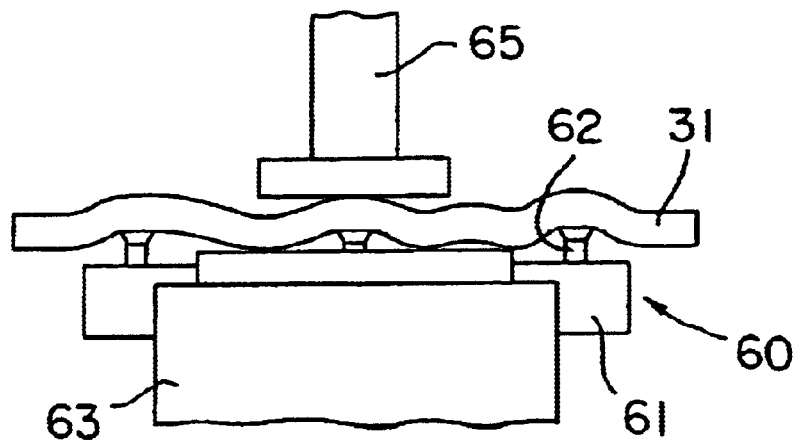
FIG. 8 is a view of assistance in explaining problems in the part mounting apparatus shown in FIG. 7.

Although the suction pads 12 and the props 13 are arranged alternately on the conveyor stage 11 in the foregoing embodiment, the suction pads 12 may be arranged at predetermined intervals on the conveyor stage 11 and the props 13 may be disposed in a predetermined relation, such as one-to-one relation, relative to the suction pads 12. For example, the plurality of suction pads 12 may be arranged along the edges of the conveyor stage 11 of the substrate conveying unit 10, and the props 13 may be disposed on the outer side of the suction pads 12 nearer to the edges and adjacently to the suction pads 12 as indicated by broke lines in FIG. 5 or may be disposed on the inner side of the suction pads 12 farther from the edges and adjacently to the suction pads 12 as indicated by continuous lines in FIG. 5. The props 13 may be tubular support members arranged along the edges of the conveyor stage 11 and the suction pads 12 may be disposed in hollow spaces defined by the props 13 as shown in FIG. 6. When the suction pads 12 and the props 13 are disposed so, the suctions of the suction pads 12 and the respective positions of the suction pads 12 and the props 13 may be adjusted according to the state of deformation of the glass substrate 31, and the respective heights of the props 13 may be adjusted according to the magnitudes of warps in the glass substrate 31 to correct the warps in the glass substrate 31.

Although the part mounting apparatus in the foregoing embodiment uses the noncontact sensor, such as a laser distance measuring instrument, as the measuring device 21, a contact-type distance measuring instrument may be used as the measuring device 21.

Although the measuring device 21 is moved along the edges of the glass substrate 31 in the foregoing embodiment, the glass substrate 31 may be moved relative to the measuring device 21. Since the glass substrate 31 can be moved relative to the measuring device 21 by the X-table 54 and the Y-table 55 of the substrate conveying unit 10, any special moving device for moving the glass substrate 31 relative to the measuring device 21 is not necessary and hence the part mounting apparatus is simple in construction. When the glass substrate 31 is moved relative to the measuring device 21, the measuring device 21 may be fixedly held by a support near the mounting position B or may be attached or detachably attached to the pressing tool 24.

When measuring the state of deformation of the glass substrate 31 by the measuring device 21, the glass substrate 31 may be supported on the suction pads 12 and the props 13 without applying suctions to the glass substrate by the suction pads 12 or with suctions applied to the glass substrate 31 by the suction pads 12.

What is claimed is:

1. A part mounting apparatus for mounting an electronic part on a substrate, said part mounting apparatus comprising:
    a substrate conveying unit that conveys a substrate;
    a backup tool that supports an edge portion of a substrate conveyed by the substrate conveying unit; and
    a pressing tool disposed on an opposite side of the backup tool with respect to the substrate;
    wherein the substrate conveying unit includes a conveyor stage, a plurality of suction pads disposed in an edge portion of the conveyor stage to hold the substrate by suction from below, and a plurality of supporting members disposed in the edge portion of the conveyor stage to support the substrate thereon in cooperation with the suction pads.

2. The part mounting apparatus according to claim 1, wherein the suction pads and the supporting members are arranged alternately.

3. The part mounting apparatus according to claim 1, wherein the plurality of suction pads are arranged along edges of the conveyor stage, and the supporting members are disposed on an outer side of the suction pads nearer to the edges with respect to the suction pads and adjacently to the suction pads or on an inner side of the suction pads farther from the edges with respect to the suction pads and adjacently to the suction pads.

4. The part mounting apparatus according to claim 1, further comprising a suction adjusting mechanism capable of adjusting suctions to be applied by the suction pads to the substrate according to a state of deformation of the substrate.

5. The part mounting apparatus according to claim 4, further a deformation measuring device for measuring a state of deformation of the substrate, and a controller for controlling respective suctions of the suction pads of the substrate conveying unit on the basis of measured data provided by the measuring device.

6. The part mounting apparatus according to claim 1, wherein the substrate conveying unit includes a position adjusting mechanism for adjusting respective positions of the suction pads according to a state of deformation of the substrate.

7. The part mounting apparatus according to claim 1, wherein the substrate conveying unit includes a position adjusting mechanism for adjusting respective positions of the supporting members according to a state of deformation of the substrate.

8. The part mounting apparatus according to claim 1, wherein the substrate conveying unit is provided with an adjusting mechanism for adjusting respective heights of the supporting members from the conveyor stage.

9. A part mounting method of mounting an electronic part on a substrate, said part mounting method comprising the steps of:
    holding a substrate on a conveyor stage by a plurality of suction pads and a plurality of supporting members disposed on the conveyor stage;
    measuring a state of deformation of the substrate held on the conveyor stage;
    adjusting at least suctions to be applied by the suction pads to the substrate, respective positions of the suction pads on the conveyor stage, respective positions of the supporting members on the conveyor stage or respective heights of the supporting members according to a measured state of deformation of the substrate;
    conveying the substrate held on the conveyor stage to a mounting position by moving the conveyor stage; and
    mounting a part on the substrate conveyed to the mounting position.

* * * * *